Aug. 30, 1960     J. F. CONNOR     2,950,843
MILK CAN HOLDER
Filed Nov. 19, 1958

INVENTOR.
JAMES F. CONNOR
BY
Oberlin, Maky, & Donnelly
ATTORNEYS

United States Patent Office 2,950,843
Patented Aug. 30, 1960

2,950,843
MILK CAN HOLDER
James F. Connor, 3453 W. 128th St., Cleveland, Ohio
Filed Nov. 19, 1958, Ser. No. 774,921
7 Claims. (Cl. 222—88)

This invention relates to an improved milk can holder and more particularly to a milk can holder that enables the person using the holder to punch pouring holes in an evaporated milk can placed therein and then, through the cooperation of the punch and holder which secures the can in the holder, to pour milk therefrom.

In the past such holders have not been effective. The milk can, as a rule, has not been tightly enough held by the holder. This permitted the milk to run down between the outside of the can and the inside of the rim of the holder resulting in cleaning and sanitary problems. Moreover, the can would often fall out of the holder when the holder was tipped too far. An example of this type of holder may be seen in my Patent No. 2,597,295.

Accordingly, it is a primary object of my invention to provide a device in the form of a combination of a can holder and punch that will securely hold a milk can or the like for the purpose of punching pouring holes therein and then emptying the contents thereof.

Another object of this invention is to provide a device of the character described in which the holder affords a convenient means for holding a milk can and a receptacle for a punch so that the punch will always be conveniently at hand for the purpose of puncturing such evaporated milk cans or the like.

A further object of the invention is to provide a device of the character described in which the punch must be inserted in its receptacle to obtain the correct operation of the holder thereby precluding the inadvertent misplacing of said punch.

A still further object of the invention is to provide a device of the character described that will accommodate various sizes of evaporated milk cans or the like, and through a cam action of the punch as it is inserted in its receptacle, will securely retain such cans in the holder.

Other objects and advantages of the present invention will occur as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
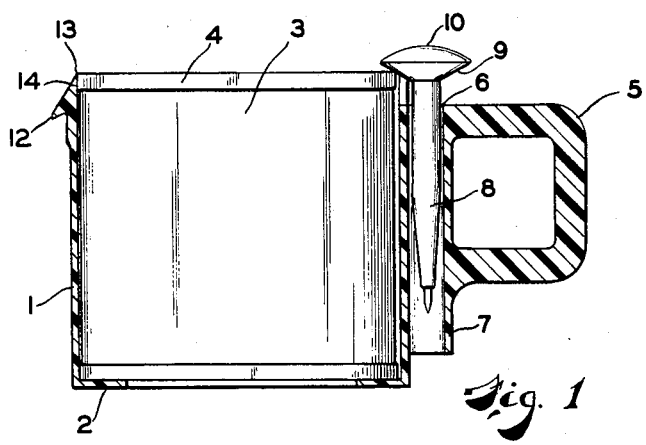
Fig. 1 is a cross-sectional view in elevation of the invention illustrating an evaporated milk can or the like and a punch inserted therein.
Figure 2:
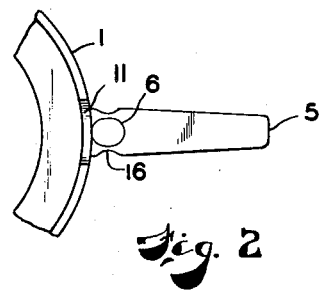
Fig. 2 is a partial top plan in view of the holder illustrating the receptacle for the punch.
Figure 3:
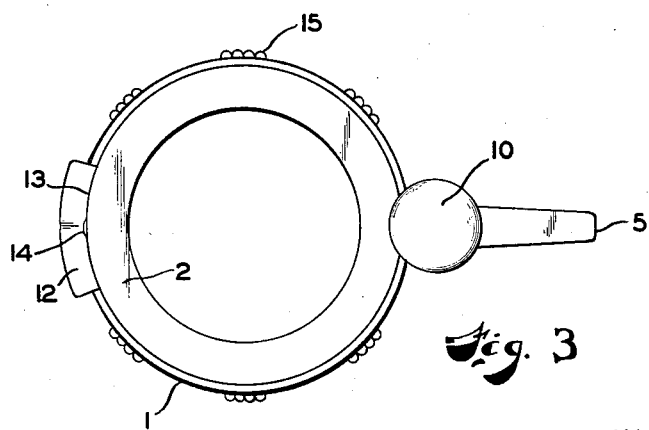
Fig. 3 is a top plan view of the holder with the punch inserted but the evaporated milk can or the like removed.

Referring now to the drawing and more particularly to Fig. 1 thereof, the device comprises a one-piece body having a generally cylindrical holder portion 1 having a bottom flange portion 2 on which the milk can 3 or the like is adapted to seat. The cylindrical holder portion 1 has an inside diameter slightly greater than the outside diameter of the rim or bead portion 4 of the evaporated milk can or the like. On one side of the cup-like body portion 1 there is a handle 5. In the handle 5, in juxtaposition to the cup-like body 1, there is an elliptical opening 6. It is thus noted that the opening 6 has a greater dimension lengthwise of the handle than transversely thereof. The opening 6 extends entirely through the handle 5 and the handle 5 may be increased in depth as at 7 so that the tip of the punch 8 may be enclosed by the handle when inserted therein. It is noted that the entire holder may be molded from a suitable plastic material such as polyethylene or the like.

The punch 8 has a conical head 9 having a rounded top portion 10. The top rim of the cup-like cylindrical body portion 1 has an opening or recess 11 therein adjacent the elliptical opening 6. This recess or opening 11 permits the conical portion 9 of the head of the punch to bear against the rim 4 of the condensed milk can or the like. Opposite the recess 11 is a pouring lip 12 forming a sharp edge 13 in the rim of the cup-like cylindrical portion 1. The sharp edge 13, formed by the pouring lip 12 has a central notch or recess 14 which is directly opposite the punch recess. The notch 14 indicates the point opposite which a hole should be punched in the top of the can. As seen in Fig. 1, the improved pouring lip 12 has a sharp set back which will permit a drop of milk or the like to flow off more freely and will preclude it from running down the face of the cylindrical cup-like body portion 1. The body portion 1 may be provided with filigree 15 or any other suitable ornamentation as desired.

The handle 5 is provided with recessed grooves 16 transversely opposite the punch opening 6. These grooves 16 attenuate the transverse walls of the opening thereby making them more easily flexed. This attenuation of the transverse walls of the opening permits the round shank portion of the punch to be frictionally inserted therein, and once inserted, it will be firmly held by the pressure of the walls against the shank portion of the punch.

In operation, the evaporated milk can or the like 4 is inserted into the cup-like body portion 1, the inner diameter of the portion 1 being so dimensioned that the can will freely drop in. The punch having been removed is then used to punch two holes in the top surface of the can, one a pouring hole opposite the notch 14, and the other a vent hole opposite the recess 11. The punch 8 is then reinserted into the opening 6. Insertion of the punch then causes the conical head 9 of the punch to bear against the rim or head 4 on the top of the evaporated milk can. As seen in Fig. 1, this will have the effect of camming or pushing the can tightly against the sharp edge 13 of the pouring lip 12. Moreover, once the punch is firmly secured within the opening 6 by the snug engagement of the shank portion and walls, it serves as a locking device preventing the can from coming out of the cup-like body portion even when the holder is in an inverted position. Thus the can is firmly secured against the sharp edge 13 in the rim of the cup-like body and any fluid poured therefrom will be precluded from running down between the can and the inside of the cup-like body portion 1.

It is noted that to be most effective, the cup-like body portion 1 should be dimensioned so that the sharp edge 13 is flush with the top surface of the can. However, cans of greater length may also be used with the holder. With such cans the conical portion 9 of the head of the punch will still act as a cam bearing against the rim portion of the milk can, thus causing it to tightly bear against sharp edge 13.

As a safety feature, the round portion 10 of the head of the punch 8 precludes the punch from being placed on end when removed from its receptacle with the point directed upwardly since the punch will fall over and remain on its side. Moreover, since the punch is required for the correct operation of the milk can holder it must be replaced in the opening 6. This precludes its inadvertent loss and therefore its availableness as a potentially dangerous instrument for children.

The holder is preferably molded of a resilient plastic material with all parts integral. Of course, any other suitable material may be used and the holder may be of any desired size for the uses intended. It will be seen that the holder provides a convenient means for holding such a can as described in a safe, sanitary manner for puncturing the same and while the contents are being used.

It is further noted that the device as described is adapted for similar use relative to cans containing liquids other than evaporated milk.

Other modes of applying the principle of the invention may be employed, change being made as regards the details described, provided the features stated in any of the following claims or the equivalent of such be employed.

I therefore particularly point out and distinctly claim as my invention:

1. A holder for evaporated milk cans or the like comprising a cup-like body adapted to receive such can, a punch receiving receptacle connected to said body and having a generally vertical opening in the top thereof adjacent the rim of said cup-like body; and a can punch having a shank snugly frictionally fitting in said receptacle through such opening and a head that extends radially inwardly of the rim of said cup-like body, said head being adapted to engage the top edge of such can to retain the same in said cup-like body when the holder is inverted to pour the contents from such can.

2. The holder of claim 1 wherein the head of the punch has a conical surface which is effective, when said punch is pushed downwardly in said vertical opening, to press such can against the side of said cup-like body that is substantially diametrically opposite said punch receptacle.

3. The holder of claim 1 wherein said cup-like body has a downwardly and outwardly sloping pouring lip that is substantially diametrically opposite said punch receptacle, said lip forming a sharp edge in the rim of said cup-like body to preclude the contents of such can from running down the inside of said cup-like body.

4. The holder of claim 3 wherein the underside of said lip is sharply undercut.

5. A holder for an evaporated milk can or the like comprising a cup-like body portion adapted to receive such can, a handle on said cup-like body portion having a vertically extending opening therein adjacent the cup-like body, a pouring lip forming a sharp edge on the rim of said cup-like body diametrically opposite said handle, and a punch adapted snugly to fit in said opening and having means thereon to cam a can in said body tightly against the sharp edge.

6. The holder of claim 5 wherein the means on said punch comprises a conical head adapted to bear against the top edge of such can as the punch is pushed downwardly in the vertically extending opening.

7. The holder of claim 6 wherein said vertically extending opening is elliptical in section and has two longitudinally extending grooves adjacent thereto in the handle, said grooves attenuating the walls of the opening making them more easily flexed.

References Cited in the file of this patent

UNITED STATES PATENTS

| | | |
|---|---|---|
| 2,024,898 | Weltner | Dec. 17, 1935 |
| 2,597,295 | Connor | May 20, 1952 |